United States Patent [19]
Nakashima et al.

[11] Patent Number: 6,035,063
[45] Date of Patent: Mar. 7, 2000

[54] ONLINE CHARACTER RECOGNITION SYSTEM WITH IMPROVED STANDARD STROKES PROCESSING EFFICIENCY

[75] Inventors: Yutaka Nakashima; Kazunaga Yoshida; Yoshikazu Ikebata, all of Tokyo, Japan

[73] Assignee: NEC Corporation, Tokyo, Japan

[21] Appl. No.: 08/868,071

[22] Filed: Jun. 3, 1997

[30] Foreign Application Priority Data

Jun. 3, 1996 [JP] Japan ..................................... 8-139898

[51] Int. Cl.⁷ .............................. G06K 9/00; G06K 9/46
[52] U.S. Cl. .......................... 382/187; 382/190; 382/195
[58] Field of Search .................................. 382/185, 186, 382/187, 189, 190, 195, 230, 231

[56] References Cited

U.S. PATENT DOCUMENTS

| | | | |
|---|---|---|---|
| 4,607,386 | 8/1986 | Morita et al. | 382/185 |
| 4,685,142 | 8/1987 | Ooi et al. | 382/185 |
| 4,718,102 | 1/1988 | Crane et al. | 382/185 |
| 5,020,117 | 5/1991 | Ooi et al. | 382/185 |
| 5,319,721 | 6/1994 | Chefalas et al. | 382/187 |

(List continued on next page.)

FOREIGN PATENT DOCUMENTS

| | | | |
|---|---|---|---|
| 60-84684 | 5/1985 | Japan | G06K 9/62 |
| 63-303488 | 12/1988 | Japan | G06K 9/62 |
| 5-38351 | 6/1993 | Japan | G06K 9/62 |
| 7-192099 | 7/1995 | Japan | G06K 9/68 |

OTHER PUBLICATIONS

Odaka et al., "Online Recognition of Handwritten Characters . . . with Several Points", *Proceedings of IECE*, vol. J63–D, No. 2, Feb. 1980, pp. 153–160.

Wakahara et al., "Stroke Number and Order Free On–Line Character Recognition . . . Linkage Method", *Proceedings of Inst. of Elec. and Comm. Eng. of Japan*, vol. J66–D, No. 5, May 1983, pp. 593–600.

Denshi, Tsushin, Gakkai, Rombunshi: "On–Line Recognition of Signature Characters by Points Resembling the Stroke." The Transactions of the Institute of Electronics and Communication Engineers of Japan, vol. J63–D, No. 2, Sec. J, pp. 153–160, Feb. 1980.

Denshi, Tsushin, Gakkai, Rombunshi: "On–line Signature Character Recognition Algorithms Without Dependence on Stroke Order," The Transactions of the Institute of Electronics and Communication Engineers of Japan, vol. J65–D, No. 6, Sec. J., pp. 679–686, Jun. 1982.

Denshi, Tsushin, Gakkai, Rombunshi: "On–line Character Recognition Devices Without Dependence on Stroke Order and Pixel Number by Select Stroke Combinations," The Transactions of the Institute of Electronics and Communication Engineers of Japan, vol. J66–D, No. 5, Sec. J. pp. 593–600, May 1983.

Odaka et al., "Stroke Order Free On–Line Handwritten Character Recognition Algorithm", *Proceedings of IECE*, vol. J65–D, No. 6, Jun. 1982, pp. 679–686.

*Primary Examiner*—Matthew C. Bella
*Attorney, Agent, or Firm*—Sughrue, Mion, Zinn, Macpeak & Seas, PLLC

[57] ABSTRACT

An online character recognition system comprises a standard stroke storing unit for storing a standard stroke and its correlated standard stroke number, a standard stroke number of strokes storing unit for storing number of strokes information indicating in how many stroke character each standard stroke appears, a character dictionary storing unit for storing a category to be recognized and its correlated standard stroke number-string, a standard stroke control unit for referring to the standard stroke number of strokes storing unit to selectively read, from the standard stroke storing unit, a standard stroke having the same number of strokes information as the number of strokes of an input character, an inter-stroke distance calculating unit for calculating an inter-stroke distance between a standard stroke read by said standard stroke control unit and an input stroke, and a matching unit for recognizing an input character based on an inter-stroke distance calculated by the inter-stroke distance calculating unit.

13 Claims, 20 Drawing Sheets

U.S. PATENT DOCUMENTS

| | | | |
|---|---|---|---|
| 5,426,711 | 6/1995 | Kitamura | 382/187 |
| 5,481,625 | 1/1996 | Suzuki | 382/187 |
| 5,533,147 | 7/1996 | Arai et al. | 382/187 |
| 5,579,408 | 11/1996 | Sakaguchi et al. | 382/187 |
| 5,734,748 | 3/1998 | Amano | 382/185 |
| 5,734,750 | 3/1998 | Arai et al. | 382/187 |
| 5,742,705 | 4/1998 | Parthasrathy | 382/185 |
| 5,796,867 | 8/1998 | Chen et al. | 382/187 |

FIG. 3

| STANDARD STROKE NUMBER | NUMBER OF STROKES INFORMATION |
|---|---|
| 1 | 1,3,4,5 |
| 2 | 1,2,3 |
| 3 | 1,2,3 |
| 4 | 1,3,8 |
| 5 | 1,2,3 |
| 6 | 8 |
| 7 | 2,3 |
| : | : |

| CATEGORY | STANDARD STROKE NUMBER-STRING |
|---|---|
| あ | 1 − 4 − 5 |
| い | 2 − 5 |
| う | 9 − 15 |
| え | 9 − 18 |
| お | 1 − 6 − 3 |
| : | : |

| STANDARD STROKE NUMBER | STANDARD STROKE |
|---|---|
| 1 | ー |
| 2 | ヽ |
| 3 | ､ |
| 4 | ノ |
| 5 | の |
| 6 | あ |
| 7 | つ |

| STANDARD STROKE NUMBER | NUMBER OF STROKES INFORMATION |
|---|---|
| 1 | 3 |
| 2 | 2 |
| 3 | 2, 3 |
| 4 | 3 |
| 5 | 1, 2, 3 |
| 6 | 3 |
| 7 | 3 |

| STANDARD STROKE NUMBER \ INPUT STROKE | ⌒ $S_1$ | ( $S_2$ | ⟲ $S_3$ |
|---|---|---|---|
| 1 | 5 | 60 | 71 |
| 2 | | | |
| 3 | 30 | 23 | 86 |
| 4 | 52 | 8 | 73 |
| 5 | 91 | 76 | 7 |
| 6 | 83 | 69 | 22 |
| 7 | 43 | 36 | 75 |

| CATEGORY | STANDARD STROKE NUMBER-STRING |
|---|---|
| あ | 1 − 4 − 5 |
| い | 2 − 3 |
| お | 1 − 6 − 3 |
| か | 7 − 4 − 3 |
| の | 5 |
| め | 2 − 5 |

| STANDARD STROKE NUMBER | STROKE ORDER INFORMATION |
|---|---|
| 1 | 1, 2, 3 |
| 2 | 1, 3 |
| 3 | 1, 2, 3 |
| 4 | 1, 2, 3 |
| 5 | 1, 2, 3 |
| 6 | 2 |
| 7 | 1, 2 |
| : | : |

| STANDARD STROKE NUMBER | STROKE ORDER INFORMATION |
|---|---|
| 1 | 1 |
| 2 | 1 |
| 3 | 2, 3 |
| 4 | 2 |
| 5 | 1, 2, 3 |
| 6 | 2 |
| 7 | 1 |

| STANDARD STROKE NUMBER / INPUT STROKE | ⌒ $S_1$ | ( $S_2$ | ⌒) $S_3$ |
|---|---|---|---|
| 1 | 5 | | |
| 2 | 32 | | |
| 3 | | 23 | 86 |
| 4 | | 8 | |
| 5 | 91 | 76 | 7 |
| 6 | | 69 | |
| 7 | 43 | | |

| STANDARD STROKE NUMBER | NUMBER OF STROKES INFORMATION | STROKE ORDER INFORMATION |
|---|---|---|
| 1 | 1,3,4,5 | 1,2,3 |
| 2 | 1,2,3 | 1,3 |
| 3 | 1,2,3 | 1,2,3 |
| 4 | 1,3,8 | 1,2,3 |
| 5 | 1,2,3 | 1,2,3 |
| 6 | 8 | 2 |
| 7 | 2,3 | 1,2 |
| : | : | : |

| STANDARD STROKE NUMBER | NUMBER OF STROKES INFORMATION | STROKE ORDER INFORMATION |
|---|---|---|
| 1 | 3 | 1 |
| 2 | 2 | 1 |
| 3 | 2, 3 | 2, 3 |
| 4 | 3 | 2 |
| 5 | 1, 2, 3 | 1, 2, 3 |
| 6 | 3 | 2 |
| 7 | 3 | 1 |

| STANDARD STROKE NUMBER / INPUT STROKE | ─ $S_1$ | ( $S_2$ | ⟲ $S_3$ |
|---|---|---|---|
| 1 | 5 | | |
| 2 | | | |
| 3 | | 23 | 86 |
| 4 | | 8 | |
| 5 | 91 | 76 | 7 |
| 6 | | 69 | |
| 7 | 43 | | |

25

ONLINE CHARACTER RECOGNITION SYSTEM WITH IMPROVED STANDARD STROKES PROCESSING EFFICIENCY

BACKGROUND OF THE INVENTION

1. Field of the Invention

The present invention relates to an online character recognition system for use in pen-inputting-capable electronic equipment for recognizing input characters online by using standard strokes which are obtained in advance by the quantization of strokes of a character to be recognized.

2. Description of the Related Art

Pen-inputting-capable electronic equipment such as an electronic note, a pen computer or the like includes an online character recognition system for conducting online recognition of characters input through a handwritten character input device. One of conventional online character recognition systems of this kind is disclosed in Japanese Patent Laying Open (Kokai) No. Heisei 5-38351, entitled "Online Character Recognition System" (Reference Literature 1).

In the online character recognition system recited in this literature, strokes of a character to be recognized (lines of strokes made from pen-down to pen-up) are quantized to generate representative strokes (hereinafter referred to as standard strokes) which are stored in standard stroke storing means. A character dictionary for use in recognizing characters stores a category to be recognized and a string of numbers allotted to standard strokes (hereinafter referred to as a standard stroke number-string) constituting a character in the category. In the character dictionary, when the order of making strokes in a character is fixed, the numbers of the standard stroke number-string allotted to the standard strokes are arranged in the order of making strokes.

In such an online character recognition system as described above, upon input of a character through a pen-inputting device, an inter-stroke distance is first calculated between each stroke of the input character and every standard stroke stored in a standard stroke storing means and is stored in an inter-stroke distance table. Inter-stroke distance here represents a displacement of a stroke of an input character from a predetermined standard stroke which are superposed with each other as a value of a distance.

Next, with respect to a category having the same number of strokes as that of the input character out of the categories stored in the character dictionary, an inter-stroke distance between the n-th (n=1, . . . , N; N: the number of strokes of a character) standard stroke and the n-th stroke of the input character is taken from the distance table. With a sum of all the inter-stroke distances from n=1 to n=N as an inter-character distance, a category that provides the minimum inter-character distance is output as a recognition result.

Such character recognition method using standard strokes in most cases enables reduction of the amount of operation required for character recognition. With 200 characters of 10 strokes to be recognized, for example, calculation of inter-stroke distances in all the characters without using standard strokes should be conducted 2000 times (=10 strokes×200 characters). On the other hand, in the character recognition method recited in the above literature, assuming standard strokes to be of 20 kinds, calculation of inter-stroke distances should be conducted only 200 times (=10 strokes×20 kinds).

The above-mentioned conventional character recognition method using standard strokes, however, has the following shortcomings.

First is that the amount of operation can not always be less than that by a method employing no standard stroke and that the amount of operation is increased in a particular case where standard strokes are of many kinds and characters to be recognized are of a small number of kinds. This is because an inter-stroke distance is obtained between each stroke of an input character and every standard stroke.

Assuming standard strokes to be of 200 kinds, for example, the character recognition method set forth in the above-described literature requires 2000 times (=10 strokes×200 kinds) of inter-stroke distance calculations, making no reduction in the amount of operation. Moreover, with 100 characters of 5 strokes and 200 kinds of standard strokes, calculation of an inter-stroke distance is required 500 times (=5 strokes×100 characters) when no standard stroke is used. When standard strokes are used, 1000 times (=5 strokes×200 kinds) of inter-stroke distance calculations are necessary to increase the amount of operation.

Second is that enormous working memory capacity is required because every calculated inter-stroke distance is stored in an inter-stroke distance table on a working memory.

SUMMARY OF THE INVENTION

An object of the present invention is to provide an online character recognition system employing an inter-stroke distance between an input stroke and a standard stroke in which processing efficiency is improved through reduction of the amount of operation.

Another object of the present invention is to provide an online character recognition system whose working memory capacity for holding an inter-stroke distance can be reduced.

According to one aspect of the invention, an online character recognition system for calculating an inter-stroke distance between each standard stroke generated in advance by quantizing strokes of a character to be recognized and each stroke of an input character to recognize the input character online using the inter-stroke distance, comprises first storage means for storing the standard stroke and its correlated standard stroke number for specifying the standard stroke, second storage means for storing, with respect to the standard stroke, predetermined structure information independent of character form, third storage means for storing a category to be recognized and its correlated standard stroke number-string of standard strokes which constitute a character corresponding to the category arranged in sequence, standard stroke control means for detecting the predetermined structure information of stroke patterns of one input character and referring to the structure information of the input stroke patterns and the structure information stored in the second storage means to read a standard stroke whose, structure information agrees with the structure information, from the first storage means, inter-stroke distance calculating means for calculating an inter-stroke distance between the standard stroke read by the standard stroke control means and the input stroke, and character recognition means for recognizing the input character based on the inter-stroke distance calculated by the inter-stroke distance calculating means.

In the preferred construction, the second storage means may store, as structure information, number of strokes information indicating in how many stroke characters the standard stroke appears, and the standard stroke control means may refer to the number of strokes information stored in the second storage means to selectively read, from the first storage means, a standard stroke whose number of strokes information includes the number of strokes of the input character.

In the preferred construction, the second storage means may store, as structure information, stroke order information indicating at which stroke of a predetermined character the standard stroke appears, and the standard stroke control means may refer to the stroke order information stored in the second storage means to selectively read, from the first storage means, a standard stroke whose stroke order information includes stroke order information of the input stroke in the input character.

In the preferred construction, the second storage means may store, as structure information, stroke order information indicating at which stroke of a predetermined character the standard stroke appears, the standard stroke control means, with respect to the input stroke patterns of one character, may refer to the stroke order information stored in the second storage means to selectively read, from the first storage means, a standard stroke whose stroke order information includes stroke order information of the input stroke in the input character, and the inter-stroke distance calculating means may calculate an inter-stroke distance between standard strokes of one character read by the standard stroke control means and each stroke of the input character.

In another preferred construction, the second storage means may store, as structure information, stroke order information indicating at which stroke of a predetermined character the standard stroke appears, the standard stroke control means, with respect to each one of the input stroke patterns, may refer to the stroke order information stored in the second storage means to selectively read, from the first storage means, a standard stroke whose stroke order information includes stroke order information of the input stroke in the input character, and the inter-stroke distance calculating means may calculate, with respect to each one of the input stroke patterns, an inter-stroke distance between a standard stroke read by the standard stroke control means and the input stroke.

The second storage means may store, as structure information, number of strokes information indicating in how many stroke characters the standard stroke appears and its correlated stroke order information indicating at which stroke of a predetermined character the standard stroke appears, and the standard stroke control means may refer to the number of strokes information and the stroke order information stored in the second storage means to selectively read, from the first storage means, a standard stroke whose number of strokes information includes the number of strokes of the input character and whose the stroke order information includes the stroke order information of the input stroke in the input character.

Also, the second storage means may include number of strokes information storing means for storing, as structure information, number of strokes information indicating in how many stroke characters the standard stroke appears and stroke order information storing means for storing stroke order information indicating at which stroke of a predetermined character the standard stroke appears, and the standard stroke control means may refer to the number of strokes information stored in the number of strokes information storing means and the stroke order information stored in the stroke order information storing means to selectively read, from the first storage means, a standard stroke whose number of strokes information includes the number of strokes of the input character and whose stroke order information includes the stroke order information of the input stroke in the input character.

Also, with respect to categories whose number of strokes is the same as that of the input character out of the categories stored in the third storage means, the character recognition means may calculate a sum of inter-stroke distances between the input stroke and the standard stroke having a stroke making order corresponding thereto according to standard stroke number-strings for the categories and take a category whose sum of inter-stroke distances is the smallest as a recognition result.

With respect to categories whose number of strokes is the same as that of the input character out of the categories stored in the third storage means, the character recognition means may generate a plurality of standard stroke number-strings by changing the order of a standard stroke number-string for the categories, calculate a sum of inter-stroke distances between the input stroke and the standard stroke having a stroke making order corresponding thereto according to all the stroke number-strings including the generated stroke number-strings and take a category whose sum of inter-stroke distances is the smallest as a recognition result.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be read as limiting to the invention, but are for explanation and understanding only.

In the drawings:

FIG. 3 is a diagram showing images of data stored in a standard stroke number of strokes storing unit of the first embodiment.

FIG. 4 is a diagram showing images of data stored in a character dictionary storing unit of the first embodiment.

FIG. 6 is a diagram showing images of data stored in the standard stroke storing unit in specific operation of the first embodiment.

FIG. 7 is a diagram showing images of data stored in the standard stroke number of strokes storing unit in specific operation of the first embodiment.

FIG. 8 is a diagram showing images of an inter-stroke distance table in specific operation of the first embodiment.

FIG. 9 is a diagram showing images of data stored in the character dictionary storing unit in specific operation of the first embodiment.

FIG. 11 is a diagram showing images of data stored in a standard stroke stroke order storing unit of the second embodiment.

FIG. 13 is a diagram showing images of data stored in the standard stroke stroke order storing unit in specific operation of the second embodiment.

FIG. 14 is a diagram showing images of an inter-stroke distance table in specific operation of the second embodiment.

FIG. 17 is a diagram showing images of data stored in a standard stroke number of strokes and stroke order storing unit of the third embodiment.

FIG. 19 is a diagram showing images of data stored in the standard stroke stroke order storing unit in specific operation of the third embodiment.

FIG. 20 is a diagram showing images of an inter-stroke distance table in specific operation of the third embodiment.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscuring the present invention.

Figure 1:
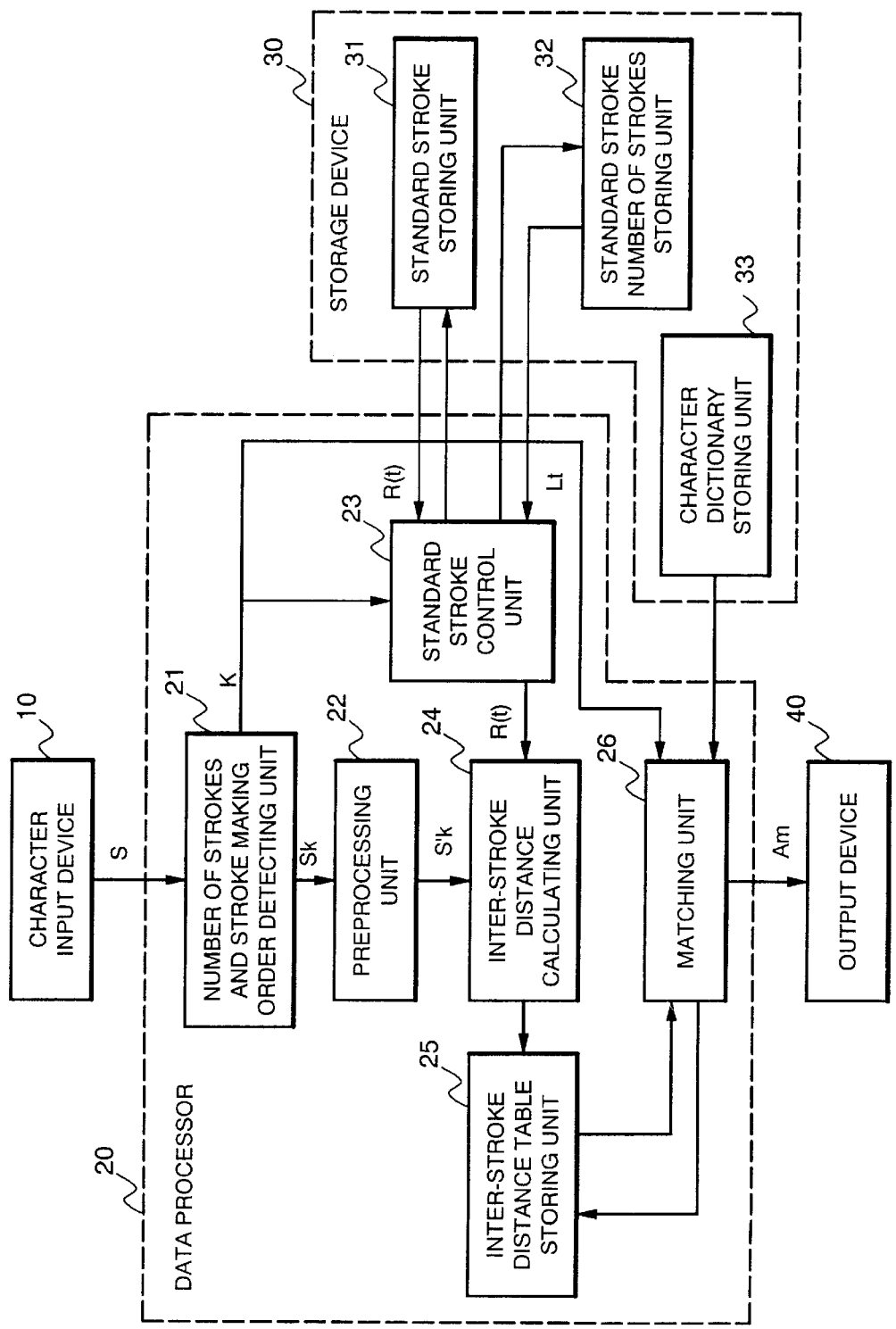
FIG. 1 is a block diagram showing structure of an online character recognition system according to a first embodiment of the present invention.

FIG. 1 is a block diagram showing structure of an online character recognition system according to a first embodiment of the present invention.

As illustrated in FIG. 1, the online character recognition system of the first embodiment includes a character input device 10 for supporting pen-inputting, a data processor 20 for conducting online character recognition processing, a storage device 30 for storing information regarding a dictionary and standard strokes, and an output device 40 for outputting characters input through the character input device 10 and recognition results.

The character input device 10, which is constituted by such a hand-written character input device as a pen tablet or a touch panel, generates stroke patterns S as a sequence of coordinate points at fixed time intervals of each input stroke of an input character and sends the patterns S to the data processor 20.

The storage device 30, which is implemented for example by an external storage device such as a magnetic disk device, an optical magnetic disk device or the like, or an internal memory such as a RAM, includes a standard stroke storing unit 31, a standard stroke number of strokes storing unit 32 and a character dictionary storing unit 33 as illustrated in the figure.

Figure 2:
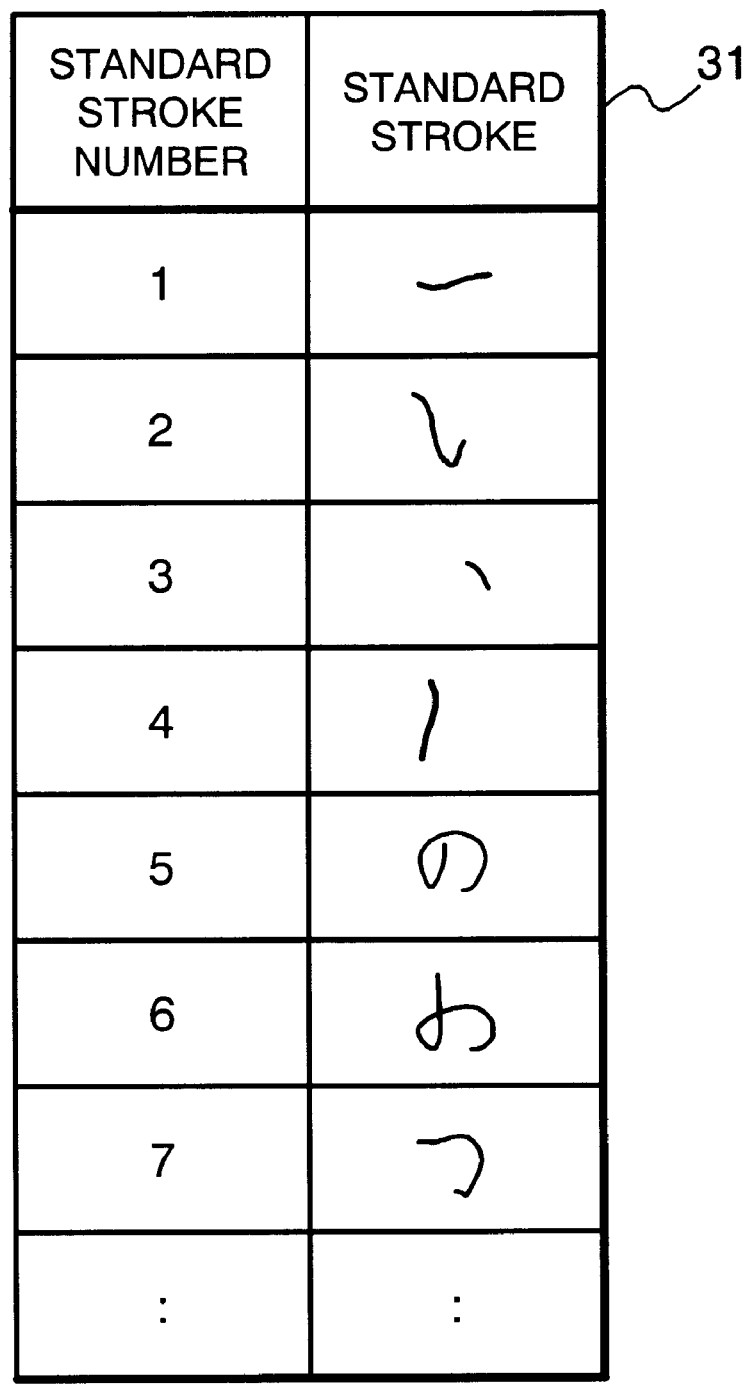
FIG. 2 is a diagram showing images of data stored in a standard stroke storing unit of the first embodiment.

The standard stroke storing unit 31 stores standard strokes which are generated by the quantization of strokes of characters to be recognized. FIG. 2 shows images of data stored in the standard stroke storing unit 31. Illustrated is an example of standard strokes of a character to be recognized which is assumed to be a Japanese alphabet.

The standard stroke number of strokes storing unit 32 stores number of strokes information wich represents a list of the total number of strokes constituting each of the characters in which each standard stroke appears. FIG. 3 shows images of data stored in the standard stroke number of strokes storing unit 32. With reference to FIG. 3, stored are the number of strokes information which indicates that a standard stroke with the standard stroke number "1" appears in characters of one stroke, three strokes, four strokes and five strokes and the number of strokes information which indicates that a standard stroke with the standard stroke number "2" appears in characters of one stroke, two strokes and three strokes.

The character dictionary storing unit 33 stores a category to be recognized and a standard stroke number-string corresponding to the category. The standard stroke number-string is an arrangement of standard strokes constituting a category in question according to the common order of making strokes and will be represented hereinafter as "$t_1$-$t_2$- . . . -$t_N$" (N: the number of strokes). FIG. 4 shows images of data stored in the character dictionary storing unit 33. With reference to FIG. 4, the standard stroke number-string of the category "あ" is 1-4-5, which represents that the character is made up of the standard stroke with the standard stroke number "1" as the first stroke, the standard stroke with the standard stroke number "4" as the second stroke and the standard stroke with the standard stroke number "5" as the third stroke.

The data processor 20, which is implemented for example by program-controlled CPU and RAM or other memory, includes a number of strokes and stroke making order detecting unit 21, a preprocessing unit 22, a standard stroke control unit 23, an inter-stroke distance calculating unit 24, an inter-stroke distance table storing unit 25 and a matching unit 26.

The number of strokes and stroke making order detecting unit 21 reads stroke patterns S of one character sent from the character input device 10 and outputs and sends a stroke pattern string $S_1, S_2, \ldots S_K$, which are in sequence according to the order of making strokes, and outputs and sends the number of strokes K of the input character to the standard stroke control unit 23 and the matching unit 26.

The preprocessing unit 22 receives input of the stroke pattern string sent from the number of strokes and stroke making order detecting unit 21 and after conducting preprocessing such as noise removal and smoothing with respect to the string, sends the processed string to the inter-stroke distance calculating unit 24.

The standard stroke control unit 23 refers to the number of strokes information stored in the standard stroke number of strokes storing unit 32 in the storage device 30 according to the number of strokes of the input character, based on the number of strokes information selectively reads, from the standard stroke storing unit 31, a standard stroke R(t) whose stroke pattern and inter-stroke distance are to be obtained and sends the read standard stroke R(t) to the inter-stroke distance calculating unit 24.

The inter-stroke distance calculating unit 24 calculates an inter-stroke distance between the standard stroke R(t) received from the standard stroke control unit 23 and each stroke pattern S'$_k$ (k=1,2, . . . , K) in the stroke pattern string received from the preprocessing unit 22. The unit 24 then sends an inter-stroke distance D(k, t) as the calculation result to the inter-stroke distance table storing unit 25.

The inter-stroke distance table storing unit 25 receives the inter-stroke distance D(k, t) calculated at the inter-stroke distance calculating unit 24 and stores the same in the inter-stroke distance table.

The matching unit 26 conducts character recognition using the inter-stroke distance D(k, t) stored in the inter-stroke distance table storing unit 25 with respect to a category having the same number of strokes as the number of strokes K received from the number of strokes and stroke making order detecting unit 21 out of the categories stored in the character dictionary storing unit 33, and sends recognition results to the output device 40.

The output device 40, which is implemented for example by a display device or a printing device, displays and prints out a character (category) which is a recognition result received from the matching unit 26 of the data processor 20.

With reference to the flow chart of FIG. 5, operation of the online character recognition system of the first embodiment will be described.

First, a stroke pattern S, which is a coordinate point sequence of one stroke is sent from the character input device 10 to the number of strokes and stroke making order detecting unit 21 in the data processor 20. While receiving input of a stroke pattern, the number of strokes and stroke making order detecting unit 21 sees at which stroke pattern of a character including a stroke pattern in question the stroke pattern stands. The unit 21 also counts the number of strokes to reach the stroke pattern (Steps 501 and 502). Then, upon receiving input of stroke patterns of one character, the unit 21 outputs the number of strokes K of the input character and a stroke pattern string $S_1, S_2, \ldots, S_K$ arranged in the order of making strokes (Step 503). The number of strokes K is sent to the standard stroke control unit 23 and the matching unit 26.

Next, the preprocessing unit 22 reads a stroke pattern $S_k$ (k=1,2, . . . ,K) one by one included in the stroke pattern string $S_1, S_2, \ldots, S_K$ output from the number of strokes and stroke making order detecting unit 21 to conduct preprocessing such as noise removal and smoothing. Then, the unit 22 sends the processed stroke pattern as a stroke pattern S'$_k$ (k=1,2, . . . , K) to the inter-stroke distance calculating unit 24 (Step 504). Preprocessing conducted here by the preprocessing unit 22 may be common noise removal, smoothing and other processing recited, for example, in the literature "Handwritten Character Online Recognition by Point Approximation of Strokes" ("Proceedings of Institute of Electronics and Communication Engineers of Japan (IECE)", Vol. J63-D No. 2 (February 1980), pp.153–160) (hereinafter referred to as "Reference Literature 2").

Next, the standard stroke control unit 23 sequentially searches for a standard stroke number t (t=1,2, . . . ,T; T: the number of standard strokes) whose number of strokes information $L_t$ stored in the standard stroke number of strokes storing unit 32 includes the number of strokes K (Steps 505, 506, 511, 512). When the standard stroke number "t" in question is detected, the unit 23 takes out a standard stroke R(t) corresponding to the standard stroke number "t" in question from the standard stroke storing unit 31 and transfers the same to the inter-stroke distance calculating unit 24 (Step 506).

The inter-stroke distance calculating unit 24 calculates an inter-stroke distance D (k, t) between the standard stroke R(t) and the stroke pattern S'$_k$ (k=1,2, . . . , K) (Steps 507–510). Here, one possible method of calculating an inter-stroke distance D (k, t) is, for example, that recited in the literature "Online Handwritten Character Recognition Algorithm Independent of Stroke Making Order" ("Proceedings of Institute of Electronics and Communication Engineers of Japan (IECE)", Vol. J65-D No. 6 (June 1982), pp.679–686)(hereinafter referred to as "Reference Literature 3"). The literature recites a method of obtaining an inter-stroke distance by calculating a distance given by Mahalanobis distance, with the stroke pattern S'$_k$ and the standard stroke R(t) as one vector. The method recited in this literature is just one example of inter-stroke distance calculating methods and other various common methods may be employed for calculation.

The calculated inter-stroke distance D (k,t) is sequentially stored in the inter-stroke distance table storing unit 25. Upon completion of the search with respect to all the standard stroke numbers "t (t=1,2, . . . ,T), the matching unit 26 calculates an inter-character distance based on the obtained inter-stroke distance D(k,t) (Step 513). Calculation of inter-character distances will be conducted by the following manner using a standard stroke number-string $t^m_1 \text{-} t^m_2 \text{-} \ldots \text{-} t^m_k$ corresponding to a category Am (m=1,2, . . . ,M; M: the number of categories whose number of strokes is K) having the same number of strokes as the number of strokes K out of the categories stored in the character dictionary storing unit 33.

A sum of inter-stroke distances D (k, $t^m_k$) between the stroke pattern S'$_k$ (K=1,2, . . . ,K) and the standard stroke R($t^m_k$) corresponding to the standard stroke number $t^m_k$, from k=1 to K, is taken as an inter-character distance DM (Am) of Am. Then, the category Am with the smallest value of the inter-character distance DM (Am) is taken as a recognition result. Here, the inter-stroke distance D (k,$t^m_k$) is obtained by reading from the inter-stroke distance table. Thus obtained recognition results are output through the output device 40 (Step 514).

Description will be next made of operation of the online character recognition system according to the first embodiment conducted when a specific character is input. As data for use in this embodiment, FIG. 6 shows data stored in the standard stroke storing unit 31, FIG. 7 shows data stored in the standard stroke number of strokes storing unit 32, FIG. 8 shows an example of an inter-stroke distance table and FIG. 9 shows data stored in the character dictionary storing unit 33.

It is assumed for example that the Japanese alphabet "あ" is input with the right number of strokes (three strokes) and in the right order of making strokes. In this case, first in the operation shown at Steps 501 to 503 of FIG. 5, the number of strokes and stroke making order detecting unit 21 detects a stroke pattern string $S_k$ (k=1,2,3) arranged in the order of making strokes and the number of strokes K=3. Then, in the operation shown at Step 504, the preprocessing unit 22 conducts preprocessing with respect to the stroke pattern string $S_k$ output from the number of strokes and stroke making order detecting unit 21 to output a stroke pattern string S'$_k$ (K=1,2,3).

Then, in the operation shown at Steps 505 to 512, the standard stroke control unit 23 first refers to the standard stroke number of strokes storing unit 32 illustrated in FIG. 7 to read, from the standard stroke storing unit 31 illustrated in FIG. 6, standard strokes R(1), R(3), R(4), R(5), R(6) and R(7) corresponding to the standard stroke numbers "1, 3, 4, 5, 6, 7" whose number of strokes information includes the number of strokes K=3, and sends the read standard strokes to the inter-stroke distance calculating unit 24. The inter-stroke distance calculating unit 24 obtains an inter-stroke distance between the standard strokes R(1), R(3), R(4), R(5), R(6) and R(7) received from the standard stroke control unit 23 and each stroke pattern S'$_k$ (k=1,2,3) received from the preprocessing unit 22 and stores the obtained inter-stroke distance in the inter-stroke distance table of the inter-stroke distance table storing unit 25 as illustrated in FIG. 8. While FIG. 8 illustrates the inter-stroke distance table as managing data in two-dimensional array, managing the data in one-dimensional array by closing an area where no inter-stroke distance is stored leads to reduction of a capacity of the inter-stroke distance table. This is also the case with inter-stroke distance tables of other embodiments which will be described in the following.

Next, in the operation shown at Step 513, the matching unit 26 refers to the character dictionary storing unit 33 illustrated in FIG. 9 to obtain an inter-character distance with respect to the categories "あ", "お", and "ぬ" whose number of strokes is the same as the number of strokes K=3 of the input character. Since the standard stroke number-string for the category "あ" is 1-4-5, a sum of the inter-stroke distances read from the inter-stroke table, the inter-stroke distance "5" corresponding to the standard stroke number "1", the inter-stroke distance "8" corresponding to the standard stroke number "4" and the inter-stroke distance "7" corresponding to the standard stroke number "5", that is, the value "20" will be the inter-character distance of "あ". In the same manner, the inter-character distance of "お" will be "160 (=5+69+86)" and that of "ぬ" will be "137 (=43+8+86)". The matching unit 26 outputs the category "あ" with the smallest inter-character distance value as a recognition result. Then in the operation shown at Step 514, the output device 40 outputs the category "あ" which is the recognition result of the matching unit 26.

As described in the foregoing, the online character recognition system of the first embodiment employs the number of strokes information provided for each standard stroke to limit standard strokes whose inter-stroke distances are to be calculated. Therefore, calculation will be conducted only of necessary inter-stroke distances, enabling the amount of operation for calculating inter-stroke distances to be reduced, while maintaining the conventional recognition rate.

As a variation of the online character recognition system of the present embodiment, it is possible at the matching unit 26 to generate a plurality of standard stroke number-strings by changing the order of the standard stroke number-string $t^m_1, t^m_2, \ldots t^m_K$ stored in the character dictionary storing unit 33 and take, as a recognition result, a category Am with the smallest inter-character distance value among inter-character distances DM(Am) obtained with respect to each standard stroke string. As another variation, it is also possible for the matching unit 26 to employ an inter-stroke distance matrix so as to deal with characters input in unfixed order of making strokes. The method employing inter-stroke distance matrix is recited, for example, in the Reference Literature 3. In these variations, character recognition can be conducted based on a relationship between the number of strokes and a stroke pattern irrespective of the order of making strokes. It is therefore possible to correctly recognize a character input in the wrong order of making strokes.

Figure 10:
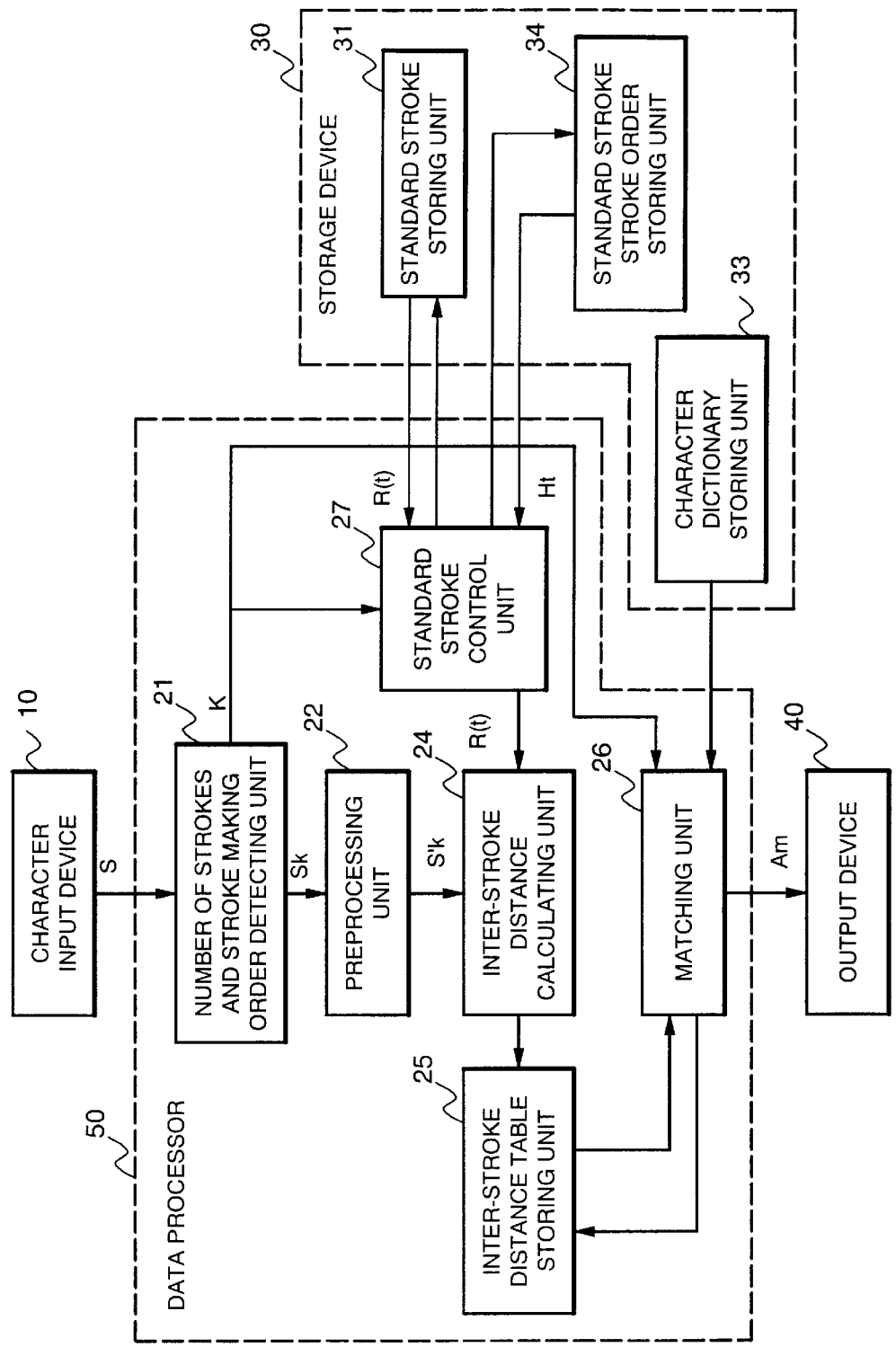
FIG. 10 is a block diagram showing structure of an online character recognition system according to a second embodiment of the present invention.

FIG. 10 is a block diagram showing structure of an online character recognition system according to a second embodiment of the present invention.

As illustrated in FIG. 10, the online character recognition system of the second embodiment includes a character input device 10 for supporting pen-inputting, a data processor 50 for conducting online character recognition processing, a storage device 60 for storing information regarding a dictionary and standard strokes, and an output device 40 for outputting an input character through the character input device 10 and a recognition result. The data processor 50, which is implemented for example by program-controlled CPU and RAM or other memory, includes a number of strokes and stroke making order detecting unit 21, a preprocessing unit 22, a standard stroke control unit 27, an inter-stroke distance calculating unit 24, an inter-stroke distance table storing unit 25 and a matching unit 26 as illustrated in the figure. The storage device 60, which is implemented for example by a magnetic disk device, an optical magnetic disk device or other external storage device, or an internal memory such as a RAM, includes a standard stroke storing unit 31, a standard stroke stroke order storing unit 34 and a character dictionary storing unit 33 as illustrated in the figure.

In the above structure, the components excluding the standard stroke control unit 27 of the data processor 50 and the standard stroke stroke order storing unit 34 of the storage device 60 are the same as their counterparts in the first embodiment shown in FIG. 1, to which the same reference numerals are allotted to omit their description.

The standard stroke stroke order storing unit 34 stores stroke order information of each standard stroke (information indicating at which stroke of a predetermined character the standard stroke in question appears). FIG. 11 shows images of data stored in the standard stroke stroke order storing unit 34. With reference to FIG. 11, stored are stroke order information, for example, that the standard stroke with the standard stroke number "1" appears as the first, second and third strokes and that the standard stroke with the standard stroke number "2" appears as the first and third strokes.

According to at which stroke of the input character in question each stroke appears, the standard stroke control unit 27 refers to the stroke order information stored in the standard stroke stroke order storing unit 34 to selectively read, from the standard stroke storing unit 31, a standard stroke whose stroke pattern and inter-stroke distance are to be obtained, and sends the read standard stroke to the inter-stroke distance calculating unit 24.

Next, with reference to the flow chart of FIG. 12, operation of the online character recognition system of the second embodiment will be described.

Figure 5:
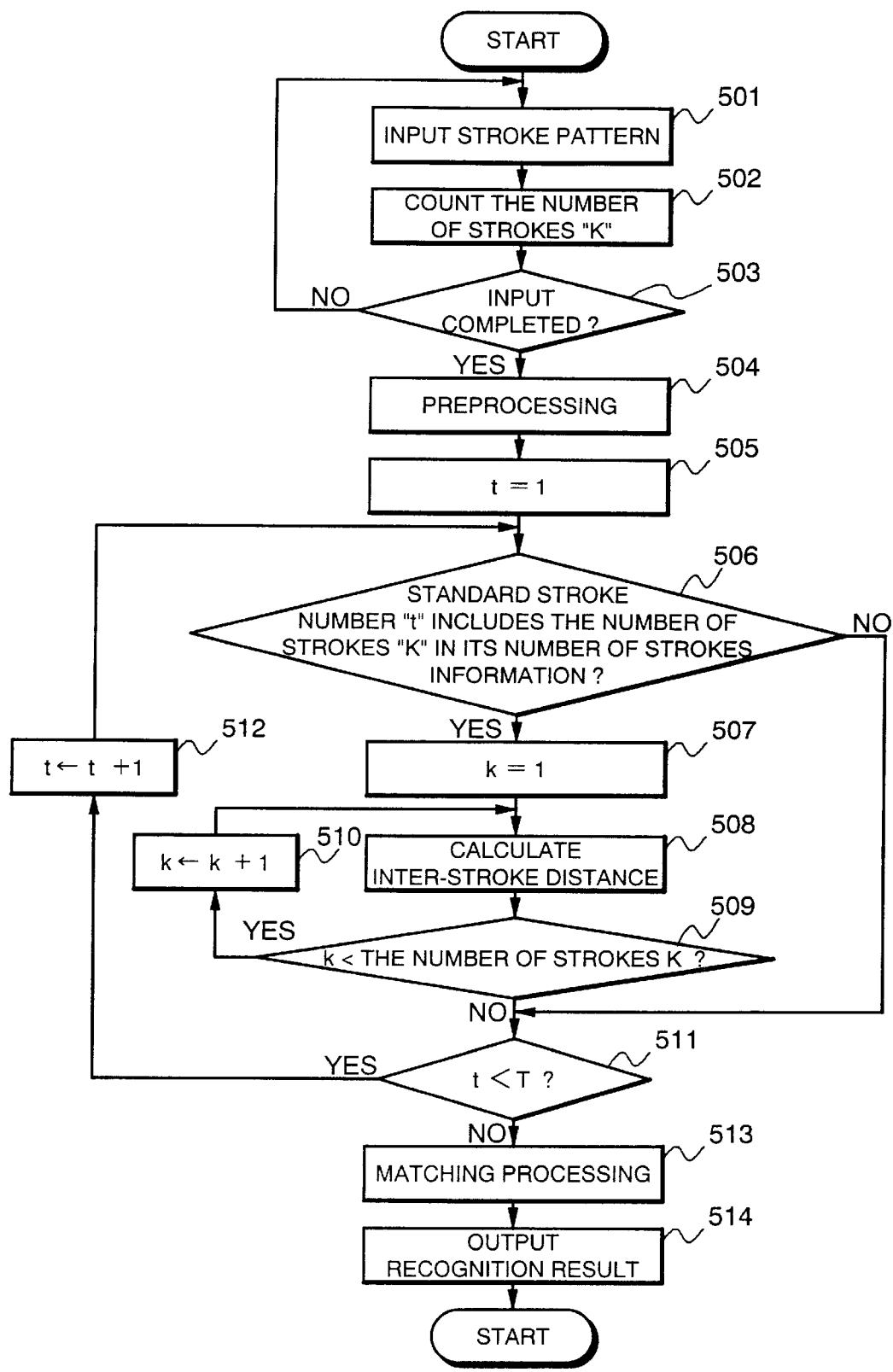
FIG. 5 is a flow chart showing operation of the first embodiment.
Figure 12:
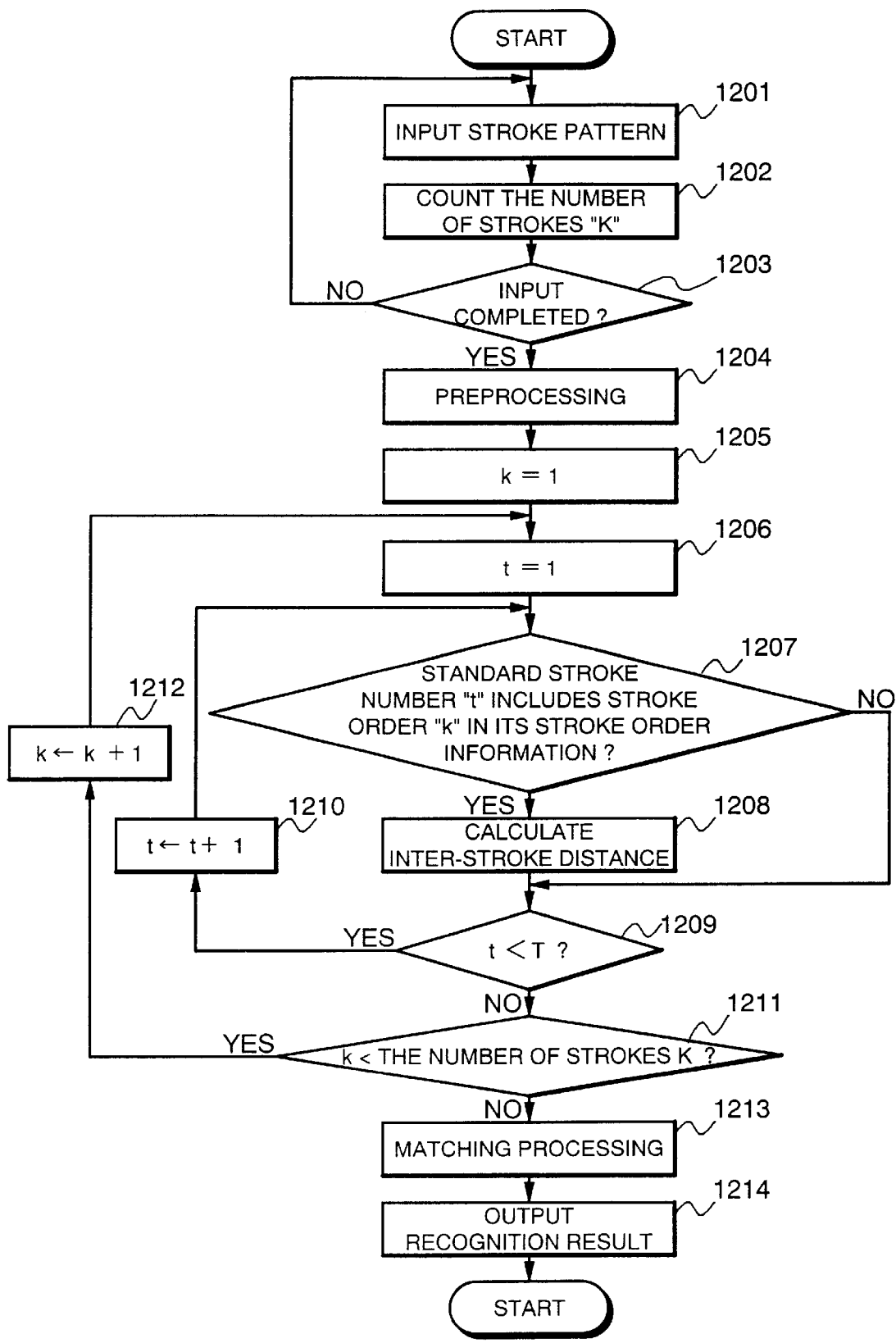
FIG. 12 is a flow chart showing operation of the second embodiment.

In the operation of the second embodiment illustrated in FIG. 12, operations from the input of a stroke pattern (Step 1201) to the preprocessing (Step 1204) are the same as those of Steps 501 to 504 shown in FIG. 5.

After the completion of the preprocessing by the preprocessing unit 22, the stroke pattern S'$_k$ (k=1,2, . . . ,K) is sent to the inter-stroke distance calculating unit 24. Then, setting the stroke order k at 1 (Step 1205), the standard stroke control unit 27 sequentially searches for a standard stroke number "t (t=1,2, . . . , T; T: the number of standard strokes) whose stroke order information H$_t$ stored in the standard stroke stroke order storing unit 34 includes the stroke order k (Steps 1206, 1207, 1209, 1210). When the standard stroke number "t" in question is detected, the standard stroke control unit 27 takes out a standard stroke R(t) corresponding to the standard stroke number "t" from the standard stroke storing unit 31 and transfers the same to the inter-stroke distance calculating unit 24 (Step 1207).

The inter-stroke distance calculating unit 24 calculates an inter-stroke distance D (k,t) between the standard stroke R(t)

and the stroke pattern S'$_k$ (Step 1208). The calculated inter-stroke distance D(k,t) is sequentially stored in the inter-stroke distance table storing unit 25. Upon completion of the search with respect to all the standard stroke numbers "t (t=1,2, ... ,T)", the stroke order is incremented by one to return to Step 1206 (Steps 1211 and 1212).

At Step 1211, when the stroke order k equals K, the matching unit 26 calculates an inter-character distance by the same processing as that of Step 513 of FIG. 5. Then, the obtained recognition result is output by the output device 40 (Step 1214).

Description will be next made of operation to be conducted when a specific character is input to the online character recognition system of the second embodiment. As the data for use in this operation, FIG. 13 shows data stored in the standard stroke stroke order storing unit 34, while FIG. 14 shows an example of an inter-stroke distance table. The data stored in the standard stroke storing unit 31 is assumed to be the same as that shown in FIG. 6 and the data of the character dictionary storing unit 33 is assumed to be the same as that shown in FIG. 9.

It is assumed for example that the Japanese alphabet "あ" is input with the right number of strokes (three strokes) and in the right order of making strokes. In this case, first in the operation shown at Steps 1201 to 1203 of FIG. 12, the number of strokes and stroke making order detecting unit 21 detects a stroke pattern string S$_k$ (k=1,2,3) arranged in sequence according to the order of making strokes and the number of strokes K=3. Then, in the operation shown at Step 1204, the preprocessing unit 22 conducts preprocessing with respect to the stroke pattern string S$_k$ output from the number of strokes and stroke making order detecting unit 21 to output a stroke pattern string S'$_k$ (k=1,2,3). Operations up to this stage are the same as those up to the preprocessing (Steps 501 to 504) in the first embodiment shown in FIG. 5.

Then, in the operation at Steps 1205 to 1212, first, the standard stroke control unit 27 sets the stroke order k at 1, refers to the standard stroke stroke order storing unit 34 illustrated in FIG. 13 to read, from the standard stroke storing unit 31 shown in FIG. 6, standard strokes R(1), R(2), R(5) and R(7) with the standard stroke numbers "1, 2, 5, 7" whose stroke order information includes the stroke order k=1, and sends the read standard strokes to the inter-stroke distance calculating unit 24. The inter-stroke distance calculating unit 24 obtains an inter-stroke distance between the standard strokes R(1), R(2), R(5) and R(7) received from the standard stroke control unit 27 and the stroke pattern S'$_1$ received from the preprocessing unit 22 and stores the obtained inter-stroke distance in the inter-stroke distance table of the inter-stroke distance table storing unit 25 as illustrated in FIG. 14.

The standard stroke control unit 27 then increments the stroke order k by one to set k at 2, refers to the standard stroke stroke order storing unit 34 shown in FIG. 13 to read, from the standard stroke storing unit 31 shown in FIG. 6, standard strokes R(3), R(4), R(5) and R(6) corresponding to the standard stroke numbers "3, 4, 5, 6" whose stroke order information includes the stroke order k=2, and sends the read standard strokes to the inter-stroke distance calculating unit 24. The inter-stroke distance calculating unit 24 obtains an inter-stroke distance between the standard strokes R(3), R(4), R(5) and R(6) received from the standard stroke control unit 27 and the stroke pattern S'$_2$ received from the preprocessing unit 22 and stores the obtained inter-stroke distance in the inter-stroke distance table of the inter-stroke distance table storing unit 25.

Next, the standard stroke control unit 27 increments the stroke order by one to set k at 3, refers to the standard stroke stroke order storing unit 34 shown in FIG. 13 to read standard strokes R(3) and R(5) corresponding to the standard stroke numbers "3, 5" whose stroke order information includes the stroke order k=2 from the standard stroke storing unit 31 shown in FIG. 6, and sends the read standard strokes to the inter-stroke distance calculating unit 24. The inter-stroke distance calculating unit 24 obtains an inter-stroke distance between the standard strokes R(3) and R(5) received from the standard stroke control unit 27 and a stroke pattern S'$_3$ received from the preprocessing unit 22 and stores the obtained inter-stroke distance in the inter-stroke distance table of the inter-stroke distance table storing unit 25.

Next, in the operation shown at Step 1213, the matching unit 26 refers to the character dictionary storing unit 33 illustrated in FIG. 9 to obtain an inter-character distance with respect to the categories "あ", "お" and "ぁ" whose number of strokes is the same as the number of strokes K=3 of the input character. Then, in the operation shown at Step 1214, the output device 40 outputs the category "あ" as the recognition result of the matching unit 26. The operations at Steps 1213 and 1214 are the same as those of Steps 513 and 514 of the first embodiment shown in FIG. 5.

As described in the foregoing, since the online character recognition system of the second embodiment employs stroke order information provided for each standard stroke to limit standard strokes whose inter-stroke distances are to be calculated, calculation is executed only of necessary inter-stroke distances. It is therefore possible to reduce the amount of operation for calculating inter-stroke distances, while maintaining conventional recognition rate.

As a variation of the online character recognition system of the second embodiment, processing of the number of strokes and stroke making order detecting unit 21, the preprocessing unit 22, the standard stroke control unit 27 and the inter-stroke distance calculating unit 24 may be conducted on a stroke basis rather than a character basis.

Figure 15:
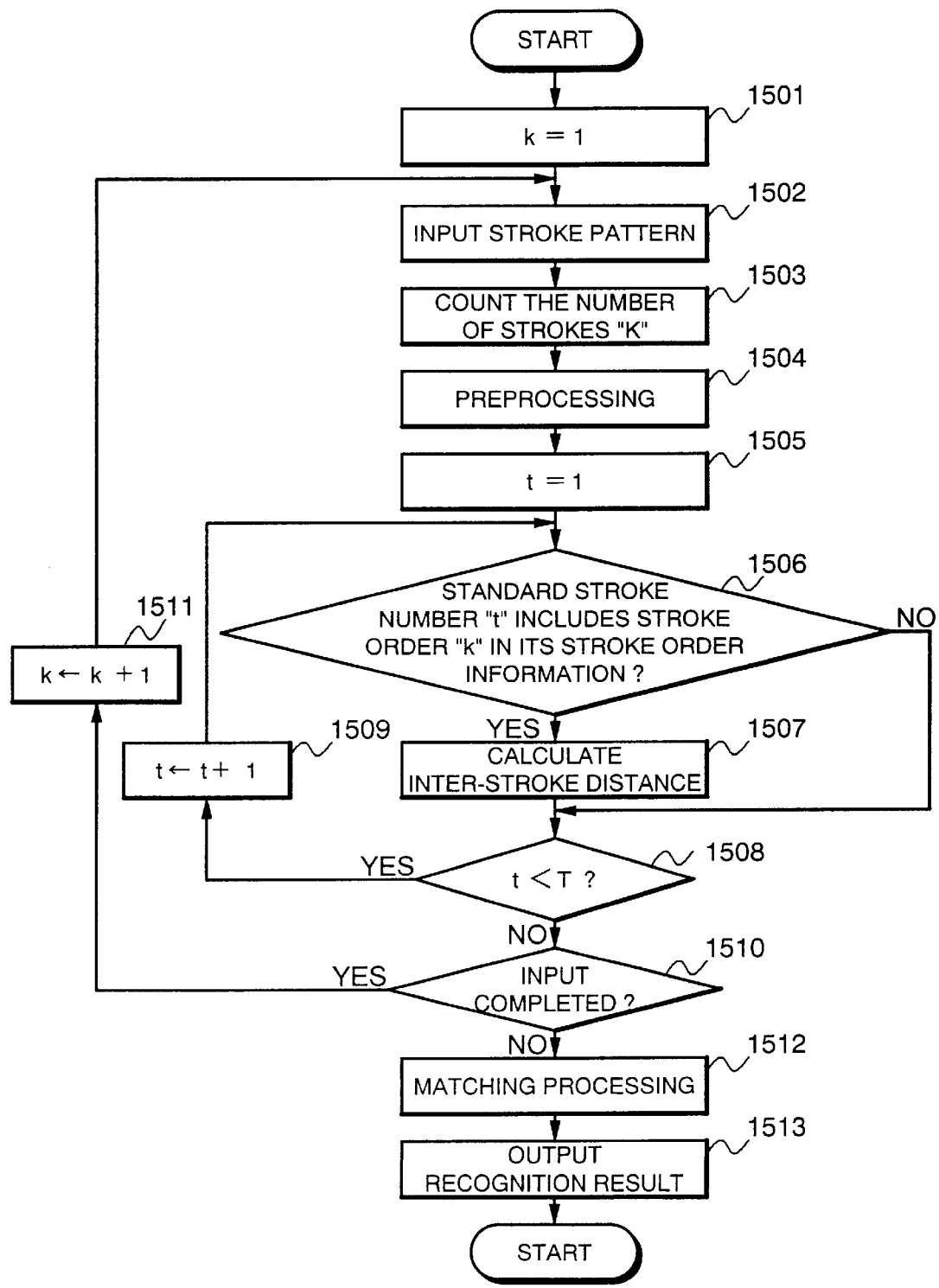
FIG. 15 is a flow chart showing variation of operation of the second embodiment.

FIG. 15 is a flow chart showing operation conducted in the variation of the second embodiment. In this variation, immediately upon input of one stroke pattern, an inter-stroke distance is calculated. More specifically, after setting the stroke order k at 1 at Step 1501, a stroke pattern S$_1$ is input to count the number of strokes to reach the stroke pattern in question (Steps 1502 and 1503). The processing conducted hereafter is the same as that of the operation of the second embodiment shown in FIG. 12, and until the input of stroke patterns of one character is completed, the stroke order k is incremented one by one to repeat the processing.

Since an inter-stroke distance is thus calculated for each stroke, as the stroke order k is increased, the limitation of standard strokes as objects of calculation can be more strict. As compared with calculation of all the inter-stroke distances conducted after the input of stroke patterns of one character, this calculation method can output recognition results quicker.

Figure 16:
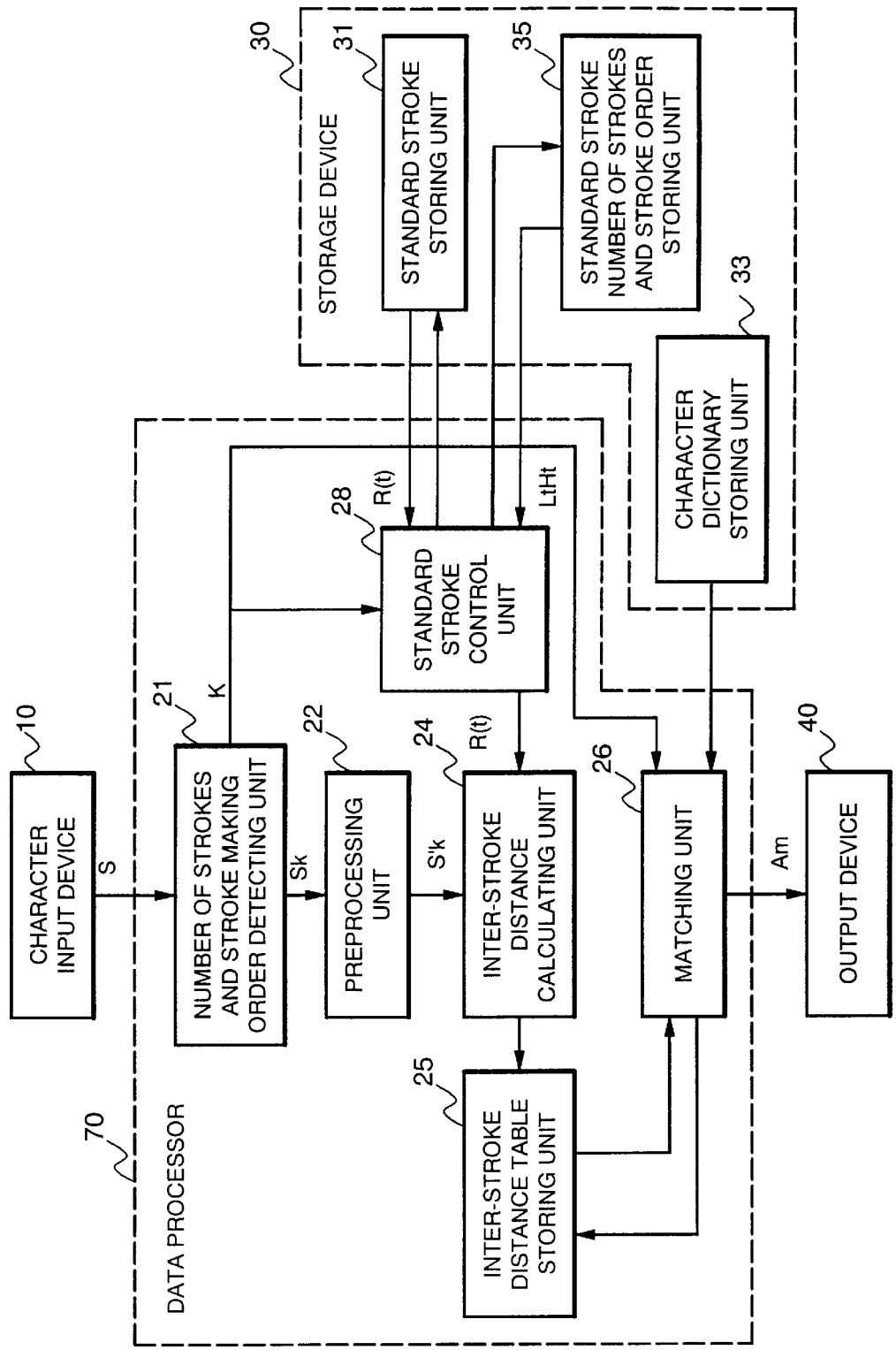
FIG. 16 is a block diagram showing structure of an online character recognition system according to a third embodiment of the present invention.

FIG. 16 is a block diagram showing structure of an online character recognition system according to a third embodiment of the present invention.

As illustrated in FIG. 16, the online character recognition system of the third embodiment includes a character input device 10 for supporting pen-inputting, a data processor 70 for conducting online character recognition processing, a storage device 80 for storing information regarding a dictionary and standard strokes, and an output device 40 for outputting an input character through the character input device 10 and a recognition result. The data processor 70, which is implemented for example by program-controlled CPU and RAM or other memory, includes a number of strokes and stroke making order detecting unit 21, a preprocessing unit 22, a standard stroke control unit 28, an inter-stroke distance calculating unit 24, an inter-stroke distance table storing unit 25 and a matching unit 26 as illustrated in the figure. The storage device 80, which is implemented for example by a magnetic disk device, an optical magnetic disk device or other external storage device, or an internal memory such as a RAM, includes a standard stroke storing unit 31, a standard stroke number of strokes and stroke order storing unit 35 and a character dictionary storing unit 33 as illustrated in the figure.

In the above structure, the components excluding the standard stroke control unit 28 of the data processor 70 and the standard stroke number of strokes and stroke order storing unit 35 of the storage device 80 are the same as their counterparts in the first embodiment shown in FIG. 1, to which the same reference numerals are allotted to omit their description.

Having a number of strokes storing area for storing the number of strokes information of each standard stroke and a stroke order storing area for storing the stroke order information of each standard stroke, the standard stroke number of strokes and stroke order storing unit 35 stores number of strokes information and stroke order information correlated with each other for each standard stroke. FIG. 17 shows images of data stored in the standard stroke number of strokes and stroke order storing unit 35. With reference to FIG. 17, stored are the number of strokes information that the standard stroke with the standard stroke number "1"s, for example, appears in a one-stroke character, a three-stroke character, a four-stroke character and a five-stroke character and the stroke order information that the standard stroke with the standard stroke number "1" appears as the first, second and third strokes, and the number of strokes information that the standard stroke with the standard stroke number "2" appears in a one-stroke character, a two-stroke character and a three-stroke character and the stroke order information that the standard stroke with the standard stroke number "2" appears as the first and third strokes.

The standard stroke control unit 28 refers to the number of strokes information and the stroke order information stored in the standard stroke number of strokes and stroke order storing unit 35 according to the number of strokes of an input character and according to which stroke of the input character each stroke corresponds, to selectively read, from the standard stroke storing unit 31, a standard stroke whose stroke pattern and inter-stroke distance are to be obtained, and sends the read standard stroke to the inter-stroke distance calculating unit 24.

Next, with reference to the flow chart of FIG. 18, operation of the online character recognition system of the third embodiment will be described.

Figure 18:
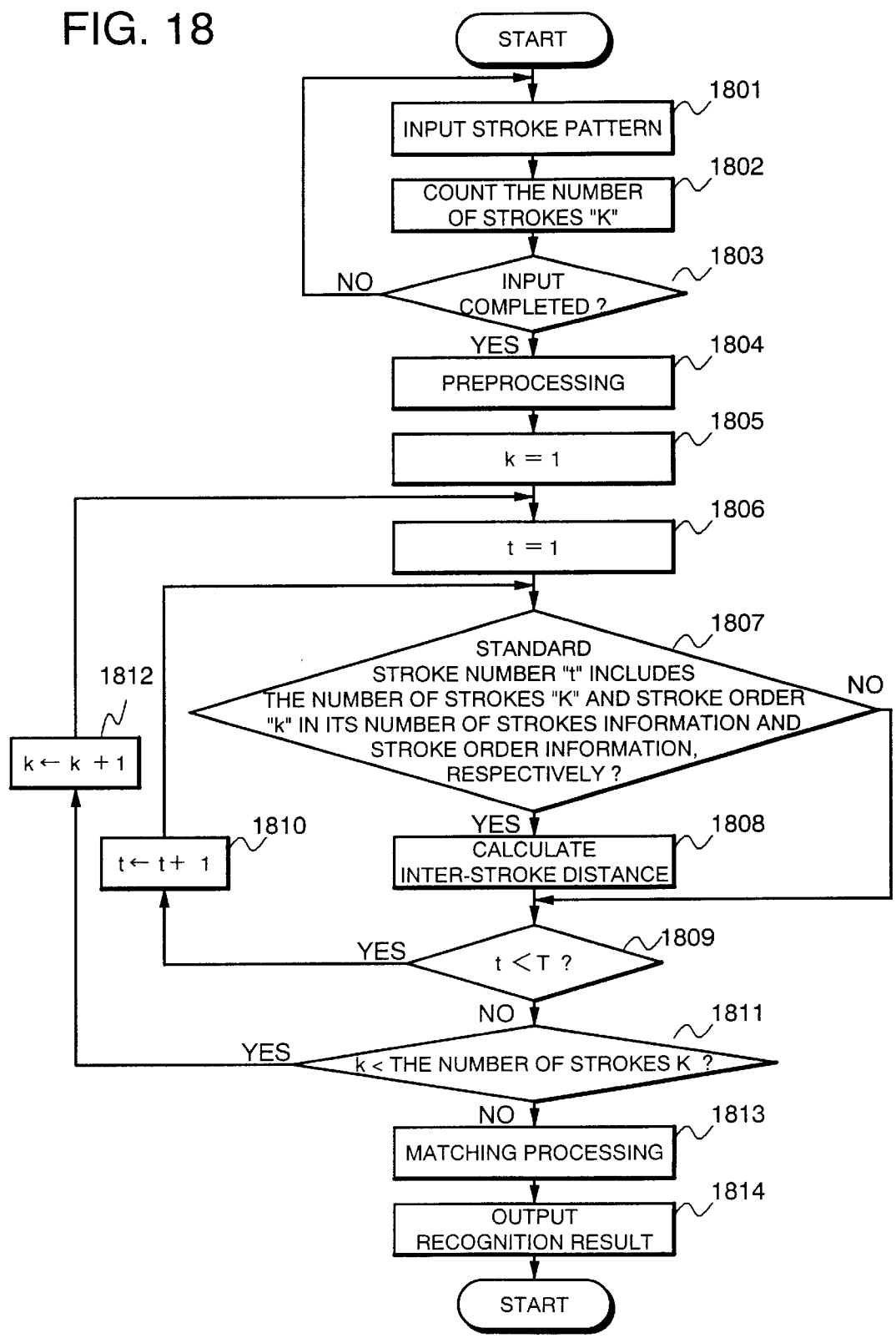
FIG. 18 is a flow chart showing operation of the third embodiment.

In the operation of the third embodiment illustrated in FIG. 18, operations from the input of a stroke pattern (Step 1801) to the preprocessing (Step 1804) are the same as those of Steps 501 to 504 shown in FIG. 5.

After the completion of the preprocessing by the preprocessing unit 22, the standard stroke control unit 27 sets the stroke order k at 1 (Step 1805) and sequentially searches for a standard stroke number "t (t=1,2, . . . , T; T: the number of standard strokes) whose stroke order information $H_t$ stored in the standard stroke number of strokes and stroke order storing unit 35 includes the stroke order k (Steps 1806, 1807, 1809, 1810). When a standard stroke number "t" in question is detected, the standard stroke control unit 27 takes out a standard stroke R(t) corresponding to the standard stroke number "t" from the standard stroke storing unit 31 and transfers the same to the inter-stroke distance calculating unit 24 (Step 1807).

Hereafter, operations of the respective processings are the same as their counterparts in the second embodiment shown in FIG. 12, which are calculation of an inter-stroke distance (Step 1808), increment of the stroke order k (Step 1812), calculation of an inter-character distance by the matching unit 26 (Step 1813) and outputting by the output device 40 (Step 1814).

Description will be next made of operations conducted when a specific character is input to the online character recognition system of the third embodiment. As the data for use in this operation, FIG. 19 shows data stored in the standard stroke number of strokes and stroke order storing unit 35, while FIG. 20 shows an example of an inter-stroke distance table. The data stored in the standard stroke storing unit 31 is assumed to be the same as that shown in FIG. 6 and the data of the character dictionary storing unit 33 is assumed to be the same as that shown in FIG. 9.

It is assumed for example that the Japanese alphabet "あ" is input with the right number of strokes (three strokes) and in the right order of making strokes. In this case, first in the operation shown at Steps 1801 to 1803 of FIG. 18, the number of strokes and stroke making order detecting unit 21 detects a stroke pattern string $S_k$ (k=1,2,3) arranged in sequence according to the order of making strokes and the number of strokes K=3. Then, in the operation shown at Step 1804, the preprocessing unit 22 conducts preprocessing with respect to the stroke pattern string $S_k$ output from the number of strokes and stroke making order detecting unit 21 to output a stroke pattern string $S'_k$ (k=1,2,3). Operations up to this stage are the same as those up to the preprocessing (Steps 501 to 504) in the first embodiment shown in FIG. 5.

Then, in the operation shown at Steps 1805 to 1812, first, the standard stroke control unit 28 sets the stroke order k at 1, refers to the standard stroke number of strokes and stroke order storing unit 35 illustrated in FIG. 19 to read, from the standard stroke storing unit 31 shown in FIG. 6, standard strokes R(1), R(5) and R(7) with the standard stroke numbers "1, 5, 7" whose number of strokes information includes the number of stroke K=3 and whose stroke order information includes the stroke order k=1, and sends the read standard strokes to the inter-stroke distance calculating unit 24. The inter-stroke distance calculating unit 24 obtains an inter-stroke distance between the standard strokes R(1), R(5) and R(7) received from the standard stroke control unit 28 and the stroke pattern $S'_1$ received from the preprocessing unit 22, and stores the obtained inter-stroke distance in the inter-stroke distance table of the inter-stroke distance table storing unit 25 as illustrated in FIG. 20.

The standard stroke control unit 28 then increments the stroke order by one to set k at 2, refers to the standard stroke stroke order storing unit 34 shown in FIG. 19 to read, from the standard stroke storing unit 31 shown in FIG. 6, standard strokes R(3), R(4), R(5) and R(6) corresponding to the standard stroke numbers "3, 4, 5, 6" whose number of strokes information includes the number of strokes K=3 and whose stroke order information includes the stroke order k=2, and sends the read standard strokes to the inter-stroke distance calculating unit 24. The inter-stroke distance calculating unit 24 obtains an inter-stroke distance between the standard strokes R(3), R(4), R(5) and R(6) received from the standard stroke control unit 28 and the stroke pattern S'$_2$ and stores the obtained inter-stroke distance in the inter-stroke distance table of the inter-stroke distance table storing unit 25.

Next, the standard stroke control unit 28 increments the stroke order by one to set k at 3, refers to the standard stroke stroke order storing unit 34 shown in FIG. 19 to read, from the standard stroke storing unit 31 shown in FIG. 6, standard strokes R(3) and R(5) corresponding to the standard stroke numbers "3, 5" whose number of strokes information includes the number of strokes K=3 and whose stroke order information includes the stroke order k=3, and sends the read standard strokes to the inter-stroke distance calculating unit 24. The inter-stroke distance calculating unit 24 obtains an inter-stroke distance between the standard strokes R(3) and R(5) received from the standard stroke control unit 28 and the stroke pattern S'$_3$ and stores the obtained inter-stroke distance in the inter-stroke distance table of the inter-stroke distance table storing unit 25.

Next, in the operation shown at Step 1213, the matching unit 26 refers to the character dictionary storing unit 33 illustrated in FIG. 9 to obtain an inter-character distance with respect to the categories "あ", "お" and "か" whose number of strokes is the same as the number of strokes K=3 of the input character. Then, in the operation shown at Step 1214, the output device 40 outputs the category "あ" as the recognition result of the matching unit 26. The operations at Steps 1213 and 1214 are the same as those of Steps 513 and 514 of the first embodiment shown in FIG. 5.

As described in the foregoing, since the online character recognition system of the third embodiment employs the number of strokes information and the stroke order information provided for each standard stroke to limit standard strokes whose inter-stroke distances are to be calculated, calculation is conducted only of necessary inter-stroke distances. It is therefore possible to reduce the amount of operation for calculating inter-stroke distances, while maintaining conventional recognition rate.

Since based on such structure information independent of character form as the number of strokes information and the stroke order information, the above-described online character recognition system of the present invention limits standard strokes whose inter-stroke distances are to be calculated, the present invention has an effect of reducing the amount of operation for calculating inter-stroke distances which operation occupies large part of the recognition processing, while maintaining conventional recognition rate for all the standard strokes. Through arbitrary setting of the above-described character structure information, limitation of standard strokes whose inter-stroke distances are to be calculated can be controlled, thereby adjusting the reduction in the amount of operation.

In addition, since only the inter-stroke distances calculated with respect to thus limited standard strokes are stored in the inter-stroke distance table, the data size of the inter-stroke distance table can be reduced to reduce the capacity of a working memory accordingly.

Although the description has been made with respect to the recognition of Japanese alphabets in the above first to third embodiments, it is apparent that the online character recognition system of the present invention is similarly adapted to other characters used in various languages such as Chinese characters, English alphabets and the Hankul alphabets.

Moreover, predetermined preprocessing conducted in the above-described first to third embodiments is not always necessary.

In addition, the above-described inter-stroke distance is not limited to the inter-stroke distance defined in the Reference Literature 3. Such inter-stroke distance may be used as recited in the article "Online Character Recognition Using Selective Stroke Linkage Independent of Number of Strokes and Stroke Making Order", the section "2.1 inter-stroke distance calculation" ("Proceedings of Institute of Electronics and Communication Engineers of Japan", Vol.J66-D No. 5 (May 1983), pp.593–600).

It is also possible to correlate one category to a plurality of standard stroke number strings at the character dictionary storing unit 33.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the features set out in the appended claims.

What is claimed is:

1. An online character recognition system which calculates an inter-stroke distance between each standard stroke generated in advance by quantizing strokes of a known character and each input stroke of an input character, for recognizing said input character online using the inter-stroke distance, comprising:

first storage means for storing said each standard stroke;

second storage means for storing a plurality of known categories;

third storage means for storing relationship data, wherein said relationship data specifies at least one relationship between said each standard stroke stored in said first storage means and said known categories in which said each standard stroke appears;

standard stroke control means for detecting input stroke data of said input character, wherein said input character is comprised of a sequence of input strokes, and wherein said standard stroke control means compares said input stroke data with said relationship data stored in said third storage means, and selects corresponding standard strokes, stored in said first storage means, whose said relationship data is in accord with said input stroke data;

inter-stroke distance calculating means for calculating an inter-stroke distance between the corresponding standard strokes read by said standard stroke control means and said each input stroke; and character recognition means for recognizing said input character based on the inter-stroke distance calculated by said inter-stroke distance calculating means.

2. The online character recognition system as set forth in claim 1, wherein said third storage means stores, as relationship data, a list of stroke totals for said each standard stroke, wherein each of said stroke totals represents a total number of strokes which make up each of the known categories in which said each standard stroke appears;

wherein said input stroke data includes an input quantity of strokes contained in said input character; and wherein said standard stroke control means references said list of stroke totals stored in said third storage means to selectively read, from said first storage means, each of said corresponding standard strokes whose said list of stroke totals includes the input quantity of strokes of said input character.

3. The online character recognition system as set forth in claim 1, wherein said third storage means stores, as relationship data, a list of stroke orders for said each standard stroke, and wherein each of said stroke orders represents a position, of said each standard stroke, in a standard writing sequence used to compose each of the known categories in which said each standard stroke appears;

wherein said input stroke data includes sequence information corresponding to said each input stroke in said sequence of input strokes; and wherein said standard stroke control means references said list of stroke orders stored in said third storage means to selectively read, from said first storage means, each of said corresponding standard strokes whose said list of stroke orders includes the sequence information corresponding to said each input stroke in said input character.

4. The online character recognition system as set forth in claim 1, wherein said third storage means stores, as relationship data, a list of stroke orders for said each standard stroke, and wherein each of said stroke orders represents a position, of said each standard stroke, in a standard writing sequence used to compose each of the known categories in which said each standard stroke appears;

wherein said input stroke data includes sequence information corresponding to said each input stroke in said sequence of input strokes;

wherein said standard stroke control means, with respect to said sequence of input strokes of a single input character, references said list of stroke orders stored in said third storage means to selectively read, from said first storage means, each of said corresponding standard strokes whose said list of stroke orders includes the sequence information corresponding to said each input stroke in said single input character; and said inter-stroke distance calculating means calculates said inter-stroke distance between said each corresponding standard stroke of a selected character read by said standard stroke control means and said each input stroke of said single input character.

5. The online character recognition system as set forth in claim 1, wherein said third storage means stores, as relationship data, a list of stroke orders for said each standard stroke, and wherein each of said stroke orders represents a position, of said each standard stroke, in a standard writing sequence used to compose each of the known categories in which said each standard stroke appears;

wherein said input stroke data includes sequence information corresponding to said each input stroke in said sequence of input strokes;

wherein said standard stroke control means, with respect to each of a plurality of sequences of input strokes of input characters, references said list of stroke orders stored in said third storage means to selectively read, from said first storage means, each of said corresponding standard strokes whose said list of stroke orders includes the sequence information corresponding to said each input stroke in said input character; and said inter-stroke distance calculating means calculates, with respect to each of said sequences of input strokes, said inter-stroke distance between said each corresponding standard stroke read by said standard stroke control means and said each input stroke of said input character.

6. The online character recognition system as set forth in claim 1, wherein said third storage means stores, as relationship data, a list of stroke totals for said each standard stroke and a list of stroke orders for said each standard stroke, wherein each of said stroke totals represents a total number of strokes which make up each of the known categories in which said each standard stroke appears, and wherein each of said stroke orders represents a position, of said each standard stroke, in a standard writing sequence used to compose each of the known categories in which said each standard stroke appears;

wherein said input stroke data includes an input quantity of strokes contained in said input character, and sequence information corresponding to said each input stroke in said sequence of input strokes; and said standard stroke control means references said list of stroke totals and said list of stroke orders stored in said third storage means to selectively read, from said first storage means, each of said corresponding standard strokes whose said list of stroke totals includes the input quantity of strokes of said input character and whose said list of stroke orders includes the sequence information corresponding to said each input stroke in said input character.

7. The online character recognition system as set forth in claim 1, wherein said third storage means includes stroke totals storing means for storing, as relationship data, a list of stroke totals for said each standard stroke, wherein each of said stroke totals represents a total number of strokes which make up each of the known categories in which said each standard stroke appears, and stroke order storing means for storing also as relationship data, a list of stroke orders for said each standard stroke, and wherein each of said stroke orders represents a position, of said each standard stroke, in a standard writing sequence used to compose each of the known categories in which said each standard stroke appears;

wherein said input stroke data includes an input quantity of strokes contained in said input character, and sequence information corresponding to said each input stroke in said sequence of input strokes; and said standard stroke control means references said list of stroke totals stored in said stroke totals storing means and said list of stroke orders stored in said stroke order storing means to selectively read, from said first storage means, each of said corresponding standard strokes whose said list of stroke totals includes the input quantity of strokes of said input character and whose said list of stroke orders includes the sequence information corresponding to said each input stroke in said input character.

8. The online character recognition system as set forth in claim 1, wherein said input stroke data includes an input quantity of strokes contained in said input character;

wherein said second storage means also stores a standard stroke number-string for each of said known categories, wherein said standard stroke number-string represents a standard stroke sequence in which said each known category is normally written;

wherein each of said plurality of known categories has a category stroke count, and with respect to said known categories whose stroke count is the same as said input quantity of strokes of said input character, out of the known categories stored in said second storage means, said character recognition means calculates a sum of inter-stroke distances between said each input stroke in said sequence of input strokes and a sequentially corresponding standard stroke listed in said standard stroke number-string for each of the known categories whose stroke count is the same as said input quantity of strokes, and takes a matching category whose said sum of inter-stroke distances is the smallest as a recognition result.

9. The online character recognition system as set forth in claim 1, wherein said input stroke data includes an input quantity of strokes contained in said input character;

wherein said second storage means also stores a standard stroke number-string for each of said known categories, wherein said standard stroke number-string represents a standard stroke sequence in which said each known category is normally written;

wherein each of said plurality of known categories has a category stroke count, and wherein a count match group is comprised of those known categories whose stroke count is the same as said input quantity of strokes of said input character, out of the known categories stored in said second storage means, and wherein said character recognition means generates a plurality of rearranged standard stroke number-strings by rearranging the order of said standard stroke sequence of said standard stroke number-string for each of the known categories in said count match group, calculates a plurality of sums of inter-stroke distances between said each input stroke in said sequence of input strokes and a plurality of sequentially corresponding standard strokes listed in said standard stroke number string and said plurality of rearranged standard stroke number strings of each of the known categories in said count match group, and takes a matching category having a smallest sum of inter-stroke distances as a recognition result.

10. An online character recognition system which calculates an inter-stroke distance between each stored standard stroke generated in advance by quantizing strokes of a known character and each input stroke of an input character, for recognizing said input character online using the inter-stroke distance, comprising:

a first storage area for storing a plurality of standard strokes;

a second storage area for storing a plurality of known characters;

a third storage area for storing relationship data, wherein said relationship data specifies at least one relationship between each of said plurality of standard strokes stored in said first storage area and a group of said known characters in which said each standard stroke appears;

a standard stroke control device for analyzing a sequence of input strokes of said input character to determine input stroke data, and wherein said standard stroke control device compares said input stroke data with said relationship data stored in said third storage area, and selects corresponding standard strokes from said first storage area whose said relationship data is in accord with said input stroke data;

an inter-stroke distance calculating device for calculating inter-stroke distances between the corresponding standard strokes read by said standard stroke control device and said each input stroke; and a character recognition device for recognizing said input character based on the inter-stroke distances calculated by said inter-stroke distance calculating device.

11. An online character recognition system as claimed in claim 10, wherein said relationship data includes a list of stroke totals for each of said plurality of standard strokes, and wherein each of said stroke totals represents a total number of strokes constituting each of the known characters in which said each standard stroke appears.

12. An online character recognition system as claimed in claim 10, wherein said relationship data includes a list of stroke orders for each of said standard strokes, and wherein each of said stroke orders represents a position, of said each plurality of standard stroke, in a standard writing sequence used to compose each of the known characters in which said each standard stroke appears.

13. An online character recognition system as claimed in claim 10, wherein said input stroke data includes:

an input quantity of strokes contained in said input character; and sequence information corresponding to said each input stroke in said sequence of input strokes.

* * * * *